US009789561B2

(12) United States Patent
Liebold et al.

(10) Patent No.: US 9,789,561 B2
(45) Date of Patent: Oct. 17, 2017

(54) APPARATUS AND METHOD FOR A LIQUID COOLED SHIELD FOR IMPROVED PIERCING PERFORMANCE

(71) Applicant: Hypertherm, Inc., Hanover, NH (US)

(72) Inventors: Stephen M. Liebold, Grantham, NH (US); Jon W. Lindsay, Hanover, NH (US)

(73) Assignee: Hypertherm, Inc., Hanover, NH (US)

( * ) Notice: Subject to any disclaimer, the term of this patent is extended or adjusted under 35 U.S.C. 154(b) by 430 days.

(21) Appl. No.: 14/496,872

(22) Filed: Sep. 25, 2014

(65) Prior Publication Data

US 2015/0028003 A1 Jan. 29, 2015

Related U.S. Application Data

(60) Continuation of application No. 13/568,577, filed on Aug. 7, 2012, now Pat. No. 8,981,252, which is a division of application No. 12/240,157, filed on Sep. 29, 2008, now Pat. No. 8,389,887, which is a continuation-in-part of application No. 12/046,670, filed on Mar. 12, 2008, now Pat. No. 8,212,173.

(51) Int. Cl.
*H05H 1/34* (2006.01)
*B23K 10/00* (2006.01)
*B23K 9/29* (2006.01)
*F28F 3/12* (2006.01)

(52) U.S. Cl.
CPC .............. *B23K 10/00* (2013.01); *B23K 9/296* (2013.01); *H05H 1/34* (2013.01); *F28F 3/12* (2013.01); *H05H 2001/3457* (2013.01)

(58) Field of Classification Search
CPC .......... B23K 9/296; B23K 10/00; H05H 1/34; H05H 2001/3457

USPC ............ 219/121.36, 121.39, 121.46, 121.48, 219/121.49, 121.5, 121.52, 121.55, 219/121.59

See application file for complete search history.

(56) References Cited

U.S. PATENT DOCUMENTS 3,641,308 A 2/1972 Couch, Jr. et al.
4,174,477 A 11/1979 Essers et al.
(Continued)

FOREIGN PATENT DOCUMENTS

DE 40 30 541 4/1992
DE 4030541 4/1992
(Continued)

OTHER PUBLICATIONS

Partial International Search Report for International Application No. PCT/US2008/078074 (3 pages).

*Primary Examiner* — Thien S Tran
(74) *Attorney, Agent, or Firm* — Proskauer Rose LLP

(57) ABSTRACT

A shield for a plasma arc torch is configured to protect consumable components of the plasma arc torch from splattering molten metal. The shield includes a generally conical unitary body defining (i) an interior surface to form a gas flow path with an outer surface of an adjacent nozzle of the plasma arc torch, and (ii) an exterior surface. The body includes (i) a distal first portion defining an exit orifice; and (ii) a proximal second portion formed of a flange sharing a common surface with the distal first portion. The shield also includes a seal assembly disposed on the common surface to retain the liquid coolant flow along the proximal second portion.

25 Claims, 9 Drawing Sheets

(56) References Cited

U.S. PATENT DOCUMENTS

| | | | | |
|---|---|---|---|---|
| 4,564,740 | A | 1/1986 | Paton et al. | |
| 4,861,962 | A | 8/1989 | Sanders et al. | |
| 5,120,930 | A | 6/1992 | Sanders et al. | |
| 5,124,525 | A | 6/1992 | Severance, Jr. et al. | |
| 5,132,512 | A | 7/1992 | Sanders et al. | |
| 5,194,715 | A | 3/1993 | Severance, Jr. et al. | |
| 5,247,152 | A | 9/1993 | Blankenship | |
| 5,340,961 | A | 8/1994 | Bebber et al. | |
| 5,393,952 | A | 2/1995 | Yamaguchi et al. | |
| 5,451,739 | A | 9/1995 | Nemchinsky et al. | |
| 5,635,088 | A | 6/1997 | Brewer et al. | |
| 5,886,315 | A | 3/1999 | Lu et al. | |
| 5,897,795 | A | 4/1999 | Lu et al. | |
| 6,069,339 | A | 5/2000 | McGrath et al. | |
| 6,084,199 | A | 7/2000 | Lindsay et al. | |
| 6,268,583 | B1 * | 7/2001 | Yamaguchi | B23K 10/00 219/121.49 |
| 6,346,685 | B2 | 2/2002 | Severance, Jr. et al. | |
| 6,452,130 | B1 | 9/2002 | Qian et al. | |
| 6,946,616 | B2 | 9/2005 | Kinerson et al. | |
| 6,947,802 | B2 | 9/2005 | Picard et al. | |
| 6,998,566 | B2 | 2/2006 | Conway et al. | |
| 7,005,600 | B2 | 2/2006 | Conway et al. | |
| 7,019,254 | B2 | 3/2006 | MacKenzie et al. | |
| 7,071,443 | B2 | 7/2006 | Conway et al. | |
| 7,132,619 | B2 | 11/2006 | Conway et al. | |
| 7,145,098 | B2 | 12/2006 | MacKenzie et al. | |
| 7,935,909 | B2 | 5/2011 | Hussary et al. | |
| 2004/0079735 | A1 | 4/2004 | Kinerson et al. | |
| 2004/0195217 | A1 * | 10/2004 | Conway | H05H 1/34 219/121.48 |
| 2005/0082263 | A1 | 4/2005 | Koike et al. | |
| 2007/0007256 | A1 * | 1/2007 | Duan | H05H 1/34 219/121.5 |
| 2008/0093346 | A1 * | 4/2008 | Yamaguchi | H05H 1/28 219/121.49 |
| 2008/0217305 | A1 | 9/2008 | Sanders | |
| 2010/0155373 | A1 | 6/2010 | Yamaguchi et al. | |

FOREIGN PATENT DOCUMENTS

| | | |
|---|---|---|
| EP | 1542514 | 6/2005 |
| JP | 10-58148 | 3/1998 |
| JP | 1058148 | 3/1998 |
| JP | 10-180448 | 7/1998 |
| JP | 10180448 | 7/1998 |
| JP | 2000-334569 | 12/2000 |
| JP | 2000334569 | 12/2000 |
| JP | 2000334570 | 12/2000 |
| WO | 9621338 | 7/1996 |
| WO | 2008087522 | 7/2008 |

* cited by examiner

APPARATUS AND METHOD FOR A LIQUID COOLED SHIELD FOR IMPROVED PIERCING PERFORMANCE

RELATED APPLICATIONS

This application is a continuation of U.S. Ser. No. 13/568,577 filed Aug. 7, 2012, which is a divisional application of U.S. Ser. No. 12/240,157 entitled "Apparatus and Method for a Liquid Cooled Shield for Improved Piercing Performance" filed on Sep. 29, 2008 (now U.S. Pat. No. 8,389,887), which is a CIP of U.S. Ser. No. 12/046,670 filed Mar. 12, 2008 (now U.S. Pat. No. 8,212,173), the contents of each of which are incorporated herein by reference in their entirety.

FIELD OF THE INVENTION

The invention generally relates to plasma arc torches. More specifically, the invention relates to retaining caps for securing torch components (e.g., consumables) to a plasma arc torch.

BACKGROUND OF THE INVENTION

Basic components of modern plasma arc torches include a torch body, an electrode (e.g., cathode) mounted within the body, a nozzle (e.g., anode) with a central orifice that produces a pilot arc to the electrode to initiate a plasma arc in a flow of a suitable gas (e.g., nitrogen or oxygen) and associated electrical connections and passages for cooling, and arc control fluids.

In piercing metal using a plasma arc torch, an important design consideration is the ejection of molten metal from the cut kerf back onto the torch which can destroy the nozzle. There are two principal modes for this destruction. First, molten metal ejected from the cut kerf can disturb the plasma jet causing it to gouge the nozzle. Second, the molten metal can solidify and adhere to the front face of the nozzle, which eventually causes an electrical bridging between the nozzle and the workpiece. This results in "double arcing" which can drastically reduce the life of a nozzle.

There have been several approaches to solving the gouging and double arcing problems created by the ejection of molten metal. In high current plasma cutting torches (e.g., 200 amperes and more), the solution has been to use a multi-piece nozzle with water injection cooling. A typical such nozzle of the type manufactured by Hypertherm, Inc. corresponding to Hypertherm Models HT400 and PAC500, the front face of the nozzle is made of a ceramic. This arrangement controls gouging and double arcing because (1) the ceramic nozzle face is non-conducting and therefore will not cause double arcing and (2) the nozzle is protected by the ceramic barrier. Further, the excellent cooling properties of the water, operating by cooling the ceramic nozzle piece and by water vapor cooling the molten metal ejected during piercing, inhibit the molten metal from bonding or fusing to the ceramic element or in the extreme case, from attacking the ceramic. A variation on the high-current, multi-component nozzle similar to the nozzle sold by Hypertherm as its Model PAC500, is a ceramic nozzle piece incorporating radial water injection, but the ceramic nozzle piece is replaced by a copper front piece. An insulating element separates the nozzle components so that the front of the nozzle is floating electrically. The copper is more readily cooled than the ceramic and it withstands abuse significantly better, and therefore has a longer life.

In some cases, a ceramic insulating sleeve is attached to the outside of the nozzle in an attempt to protect the nozzle. This is a so-called "shield cup". Its main purpose is to stop nozzle-to-workpiece contact. An operator can touch or drag the torch on the workpiece without double arcing. This ceramic sleeve, however, offers little or no protection during piercing against molten metal splatter and the attendant gouging and double arcing problems. Also, the ceramic shield (1) can be brittle and can break easily and (2) as a result of not having the protection of water cooling, can be attacked by the molten metal ejected from the cut.

Cooling consumables (e.g., shield) of a plasma arc torch with a cooling liquid (e.g., water) can have safety benefits. Without liquid cooling, the consumables can reach extremely high temperatures that can pose a safety issue during use. A lossless cooling system allows the use of a dry plasma and a dry cutting table. Dry tables can be desirable due to the reduced mess and elimination of the need to dispose of the used/contaminated water, which can be considered to be hazardous waste.

SUMMARY OF THE INVENTION

In some aspects of the invention, these problems can be reduced or, in some cases eliminated, using a gas and/or liquid cooled shield that operates at reduced temperatures and inhibits slag formation on an exposed surface of the shield during piercing, thereby extending the useful life of the shield and enhancing the cut quality of a plasma arc torch. For example, formation/buildup of slag on the shield can affect defining an initial height of the torch, which can affect the cut quality of the plasma arc torch. Formation of slag on a shield can also block vent holes and/or an orifice of the shield, affecting both cut quality and the life of the shield (e.g., by affecting the ability to cool the shield). Slag formation on a shield can, in some cases, melt the shield. By way of example, in some embodiments, if the plasma arc torch is used to cut steel and the shield is made of copper, the slag can melt the shield, as steel has a higher melting point than copper. Slag formation can also cause the shield to buildup heat to the point of the oxidation temperature of the shield (e.g., if the shield is made from copper, heat buildup from the slag can cause high copper temperatures that result in oxidation of the copper), thereby causing degradation of the shield (e.g., at the edges of the orifice).

In one aspect, the invention features a shield for a plasma arc torch that pierces and cuts a metallic workpiece producing a splattering of molten metal directed at the torch, the shield protecting consumable components of the plasma arc torch from the splattering molten metal. The shield can include a body, a first surface of the body configured to be contact-cooled by a gas flow and a second surface of the body configured to be contact-cooled by a liquid flow. The shield can also include a seal assembly configured to be secured to the body and disposed relative to the second surface configured to retain the liquid flow contact-cooling the second surface.

In another aspect, the invention features a method for reducing formation of slag on a shield secured to a plasma arc torch that pierces and cuts a metallic workpiece producing splattered molten metal directed at the torch. The method can include the step of contact-cooling a first surface of the shield by a gas flow, contact-cooling a second surface of the shield by a liquid flow and providing a seal assembly to retain the liquid flow, the seal assembly configured to retain the liquid in contact with the second surface relative to a retainer cap of the plasma arc torch. The method can also include conductively cooling a third surface of the shield exposed to the splattered molten metal by providing a thermal conductive path formed at least in part of a thermally conductive material in thermal communication with the first surface and the second surface.

In yet another aspect, the invention features a method for reducing formation of slag on a shield secured to a plasma arc torch that pierces and cuts a metallic workpiece producing splattered molten metal directed at the torch. The method can include the step of rapidly cooling the shield secured to the plasma arc torch with a cooling medium flow, retaining the cooling medium flow in the plasma arc torch, and repeatedly cooling the shield (e.g., cooling the shield a plurality of times, a plurality of cycles, etc.) to prevent formation of slag on a surface of the shield exposed to the splattered molten metal.

In one aspect, the invention features a shield for a plasma arc torch that pierces and cuts a metallic workpiece producing a splattering of molten metal directed at the torch. The shield can include a portion configured to be directly cooled by a flowing liquid. The shield can also include a first sealing mechanism and a second sealing mechanism disposed relative to the portion directly cooled by a flowing liquid, the first and second sealing mechanism configured to retain the flowing liquid directly cooling the portion of the shield relative to a retainer cap of the plasma arc torch.

In another aspect, the invention features a plasma arc torch system. The plasma arc torch system can include a plasma arc torch, a cooling device configured to provide a cooling medium and a shield disposed relative to the plasma arc torch, a first portion of the shield being exposed to splattering molten metal. The shield can include a second portion directly cooled by the cooling medium flowing from the cooling device, the second portion in thermal communication with the first portion exposed to splattering molten metal. The shield can also include a sealing device configured to retain the cooling medium flowing from the cooling device, the sealing device configured to retain the cooling medium in contact with the second portion of the shield in the plasma arc torch.

In yet another aspect, the invention features a retaining cap for a plasma arc torch that includes an outer component having an interior surface and an exterior surface which defines, at least in part, a first liquid coolant channel. The retaining cap can include an inner component circumferentially disposed within the outer component and having an exterior surface and an interior surface which defines, at least in part, a second liquid coolant channel. The retaining cap can also include a gas flow channel defined at least in part by the interior surface of the outer component and the exterior surface of the inner component. A port can be located at an end of the gas flow channel between the interior surface of the outer component and the exterior surface of the inner component.

In another aspect, the invention features a shield retaining cap for retaining a shield to a plasma arc torch. The shield retaining cap can include an outer component having an interior surface and an exterior surface and an inner component circumferentially disposed within the outer component and having an interior surface and exterior surface. The shield retaining cap can also include a liquid coolant channel where a first portion of the liquid coolant channel can be defined, at least in part, by a portion of the interior surface of the inner component. A second portion of the liquid coolant channel can be defined, at least in part, by the exterior surface of the inner component and the interior surface of the outer component. The shield retaining cap can include a port between the exterior surface of the inner component and the interior surface of the outer component. The port can be disposed at an end of at least one of the outer component or the inner component of the shield retaining cap.

In another aspect, the invention features a retaining cap for a plasma arc torch that includes a shell having an exterior surface that defines, at least in part, a first liquid coolant channel. A liner can be circumferentially disposed within the shell and have an interior surface that defines, at least in part, a second liquid coolant channel. The retaining cap can also include a gas flow channel defined at least in part by and located between the shell and the liner.

In another aspect, the invention features a shield retaining cap for a plasma arc torch that includes a shell, a liner disposed circumferentially within an interior surface of the shell and a liquid coolant channel. A first portion of the liquid coolant channel can be defined, at least in part, by an interior surface of the liner. A second portion of the liquid coolant channel can be defined, at least in part, by a portion of the interior surface of the shell. The second portion of the liquid coolant channel can also be defined, at least in part, by a portion of an exterior surface of the liner.

In another aspect, the invention features a method for cooling a plasma arc torch. The method can include the step of directing a liquid coolant to an electrode, directing the liquid coolant to a nozzle through a first liquid coolant channel defined, at least in part, by a first retaining cap and directing the liquid coolant from the nozzle to a shield through a second liquid coolant channel defined, at least in part, by a second retaining cap. Alternatively, the sequence in which the coolant is directed to the electrode, nozzle, and shield can be reversed or reordered.

In yet another aspect, the invention features a plasma arc torch system that includes a torch body including a plasma gas flow path for directing a plasma gas to a plasma chamber in which a plasma arc is formed, an electrode and a nozzle disposed relative to the electrode to define the plasma chamber. The plasma arc torch system can also include a retaining cap as described above, secured relative to a nozzle. The plasma arc torch system can also include a shield disposed relative to the nozzle and a shield retaining cap as describe above, secured relative to the shield.

In another aspect, the invention features a shield retaining cap for a plasma arc torch that includes a substantially cylindrical body dimensioned to receive a shield of the plasma arc torch and a liquid coolant channel defined by the substantially cylindrical body. The liquid coolant channel can include a return path and a supply path which directs a coolant to impinge a circumferentially extending portion of the shield.

In other examples, any of the aspects above, or any apparatus or method described herein, can include one or more of the following features.

A seal assembly on a shield can be in mechanical communication with a retaining cap. In some embodiments, the shield is in communication with the plasma arc torch, the shield generally surrounding a nozzle of the plasma arc torch.

In some embodiments, a shield can include a first surface of the body configured to be contact-cooled by a gas flow that convectively cools the first surface. The shield can include a second surface of the body configured to be contact-cooled by a liquid flow, where the liquid flow convectively cools the second surface. The shield can include a region conductively cooled by at least one of the gas flow or the liquid flow. In some embodiments, the region conductively cooled includes a temperature gradient across the region.

In some embodiments, the shield can also include a flange disposed proximally relative to a surface of the shield that is exposed to the molten metal, where at least a portion of the second surface of the body configured to be contact-cooled by a liquid flow, is disposed on the flange.

The shield can also include an orifice disposed at a distal end of a body of the shield. In some embodiments, the shield includes a third surface disposed relative to a distal end of the body of the shield, the third surface exposed to splattering molten metal. The second surface configured to be contact-cooled by a liquid flow, can be disposed proximally relative to the third surface. In some embodiments, the third surface exposed to splattering molten metal is conductively cooled by the liquid flow. The third surface exposed to splattering molten metal can be conductively cooled by the gas flow.

In some embodiments, a second surface can be contact-cooled by a liquid flow, the second surface disposed relative to a first end of the shield. A shield can include a third surface exposed to splattered molten metal, and can be disposed relative to a second end of the shield. The shield can also include a flange disposed relative to the first end of the shield, at least a portion of the first surface (e.g., surface contact-cooled by a gas flow) and second surface disposed on the flange. In some embodiments, contact-cooling a second surface of a shield by the liquid flow includes providing for constant liquid flow around an outer surface of the shield.

Rapidly cooling a shield can include cooling the shield such that molten metal is cooled to prevent strengthening of the bond between the molten metal and the shield. In some embodiments, rapidly cooling a shield includes cooling the shield so that the shield stays at substantially the same temperature during piercing as before piercing by extracting the heat from the molten metal in contact with the surface of the shield. In some embodiments, rapidly cooling a shield includes contact-cooling a surface of the shield in thermal communication with the surface of the shield exposed to the splattered molten metal.

A surface of the shield exposed to the splattered molten metal can be conductively cooled. The shield can be cooled to below ambient temperature. In some embodiments, the shield is cooled to below about 60 degrees Fahrenheit.

The shield can also include a portion configured to be directly cooled by a gas. A shield can include a lip, wherein a portion of the shield configured to be directly cooled by the liquid is disposed on the lip. In some embodiments, a portion of the shield configured to be directly cooled by a liquid is disposed on an outer surface of the shield. The gas-cooled portion can be disposed on an inner surface of the shield.

The shield can include a sealing mechanism, which can include at least one of an o-ring, epoxy seal or hard metal contact seal.

In some embodiments, a cooling device provides a cooling medium and the cooling device is a chiller. The cooling medium can repeatedly cool a portion of the shield. In some embodiments, the shield includes a first portion exposed to splattering molten metal and a second portion repeatedly cooled by a cooling medium (e.g., gas or liquid), the second portion in thermal communication with the first portion exposed to splattering molten metal.

A retaining cap can define a first liquid coolant channel and a second liquid coolant. The first liquid coolant channel can be in fluid communication with the second liquid coolant channel. The first liquid coolant channel can be a return flow of liquid coolant. The second liquid coolant channel can be a supply flow of liquid coolant. In some embodiments, the retaining cap can include a gas flow channel that supplies a shield gas to a workpiece.

In some embodiments, an interior surface of an inner component of a retaining cap is secured relative to a nozzle of the plasma arc torch. The interior surface of the inner component of a retaining cap can include a sealing assembly that seals liquid coolant relative to a plasma arc torch body. The interior surface of the inner component and a plasma arc torch body define, at least in part, the second liquid coolant channel. In some embodiments, a retaining cap includes an outer component where the exterior surface of the outer component and an outer retaining cap of the plasma arc torch define, at least in part, the first liquid coolant channel.

A shield retaining cap can have an inner and outer component, where at least one of the inner component or the outer component is secured relative to a shield. In some embodiments, a shield retaining cap includes a port that is disposed at an end of the liquid coolant channel defined by or formed by the shield. The liquid coolant channel can direct a coolant on to a shield. In some embodiments, a first portion of the liquid coolant channel is a coolant supply flow and a second portion of the liquid coolant channel is a coolant return flow. In some embodiments, an interior surface of the inner component of the shield retaining cap and an inner retaining cap define at least in part, the first portion of the liquid coolant channel.

In some embodiments, a temperature of the coolant impinging the shield is consistent at each point along the circumferentially extending portion of the shield. The shield retaining cap can define, at least in part, a liquid coolant channel that directs a coolant to a portion of the shield. In some embodiments, a shield retaining cap has a substantially cylindrical body that includes a substantially cylindrical outer component and a substantially cylindrical inner component disposed within the outer component. A supply path for a liquid coolant channel can be formed at least in part by an interior surface of the substantially cylindrical inner component. A return path of a liquid coolant channel can be formed at least in part by an exterior surface of the substantially cylindrical inner component and an interior surface of the substantially cylindrical outer component.

In another aspect, the invention features a shield for a plasma arc torch that pierces and cuts a metallic workpiece, producing a splattering of molten metal directed toward the torch. The shield is configured to protect consumable components of the plasma arc torch from the splattering molten metal. The shield includes a generally conical unitary body defining an interior surface to form a gas flow path with an outer surface of an adjacent nozzle of the plasma arc torch and an exterior surface. The body includes a distal first portion defining an exit orifice, which has (i) an exterior surface region exposed to the molten metal and formed along the exterior surface of the body, and (ii) an interior surface region to be contacted by a cooling shield gas flow within the gas flow path along the interior surface of the body to cool the nozzle and the shield.

The shield also includes a proximal second portion formed of a flange sharing a common surface with the distal first portion having one or more surface regions to be directly cooled by a liquid coolant flow along the common surface shared with at least one of the exterior surface of the body or the interior surface of the body. The exterior surface region of the distal first portion is conductively cooled by the direct liquid cooling of the flange along a thermally conductive path formed through a continuous conductively cooled region so as to limit the molten metal splatter from bonding to the exterior surface of the distal first portion. At least a portion of the conductively cooled region is disposed adjacent the flange. A seal assembly is disposed on the common surface shared between the flange of the proximal second portion and the distal first portion along the unitary body to retain the liquid coolant flow along the proximal second portion, to limit leakage of the liquid coolant flow from the plasma arc torch, and limit the liquid coolant flow from contacting the nozzle.

In some embodiments, the unitary body is formed of a consistent thermal medium. In some embodiments, at least a portion of the surface region to be directly cooled by the liquid coolant flow is an outer exterior surface of the flange. In some embodiments, the body defines one or more exit ports formed through the distal first portion. In some embodiments, the one or more surface regions to be directly cooled by a liquid coolant reduces molten splatter material from accumulating on the shield during use of the torch.

In some embodiments, the cooling shield gas flow convectively cools the interior surface of the body. In some embodiments, the liquid coolant flow convectively cools the one or more surface regions of the flange. In some embodiments, the seal assembly is in mechanical communication with a retaining cap that attaches the shield to the plasma arc torch. In some embodiments, the continuous conductively cooled region comprises a temperature gradient across the region. In some embodiments, the liquid coolant flow comprises a liquid chilled to less than about 60 degrees Fahrenheit.

In some embodiments, the exterior surface region exposed to the molten metal is chilled to less than about 60 degrees Fahrenheit during use of the plasma arc torch. In some embodiments, a channel is located in the body between the distal first portion and the proximal second portion. The channel can be configured to accept the seal assembly that retains the liquid coolant flow along the proximal second portion.

In some embodiments, the exterior surface region exposed to the molten metal and formed along the exterior surface of the body is sufficiently large to intercept substantially all of the molten metal splatter. In some embodiments, the seal assembly comprises at least one of an o-ring, an epoxy seal, or a metal-to-metal contact seal. In some embodiments, the shield is attachable to the plasma arc torch, the shield configured to surround a nozzle of the plasma arc torch. In some embodiments, the unitary body is a single piece.

In some embodiments, the direct liquid cooling prevents strengthening of a bond between the molten metal splatter and the exterior surface region of the distal first portion. In some embodiments, the shield is configured to be rapidly cooled such that the shield stays at substantially the same temperature during piercing as before piercing by extracting heat from the molten metal that is in contact with the third surface of the shield. In some embodiments, the shield is configured to be cooled to operate below ambient temperature.

In some embodiments, the direct liquid cooling includes a constant liquid flow around the proximal second portion of the body. In some embodiments, a cooling device configured to provide a cooling medium, wherein the cooling device is a chiller. In some embodiments, the unitary body is a one-piece solid body. In some embodiments, the distal first portion has a substantially consistent thickness between the exterior surface region and the interior surface region. In some embodiments, a length of the distal portion is greater than a length of the proximal portion.

In some embodiments, the exterior surface region exposed to the molten metal and formed along the exterior surface of the body is sufficiently large to intercept substantially all of the molten metal splatter. In some embodiments, a distance between the exit orifice and the one or more exit ports is greater than a distance between the one or more exit ports and the seal assembly.

Other aspects and advantages of the invention can become apparent from the following drawings and description, all of which illustrate the principles of the invention, by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION OF THE INVENTION

Figure 1:
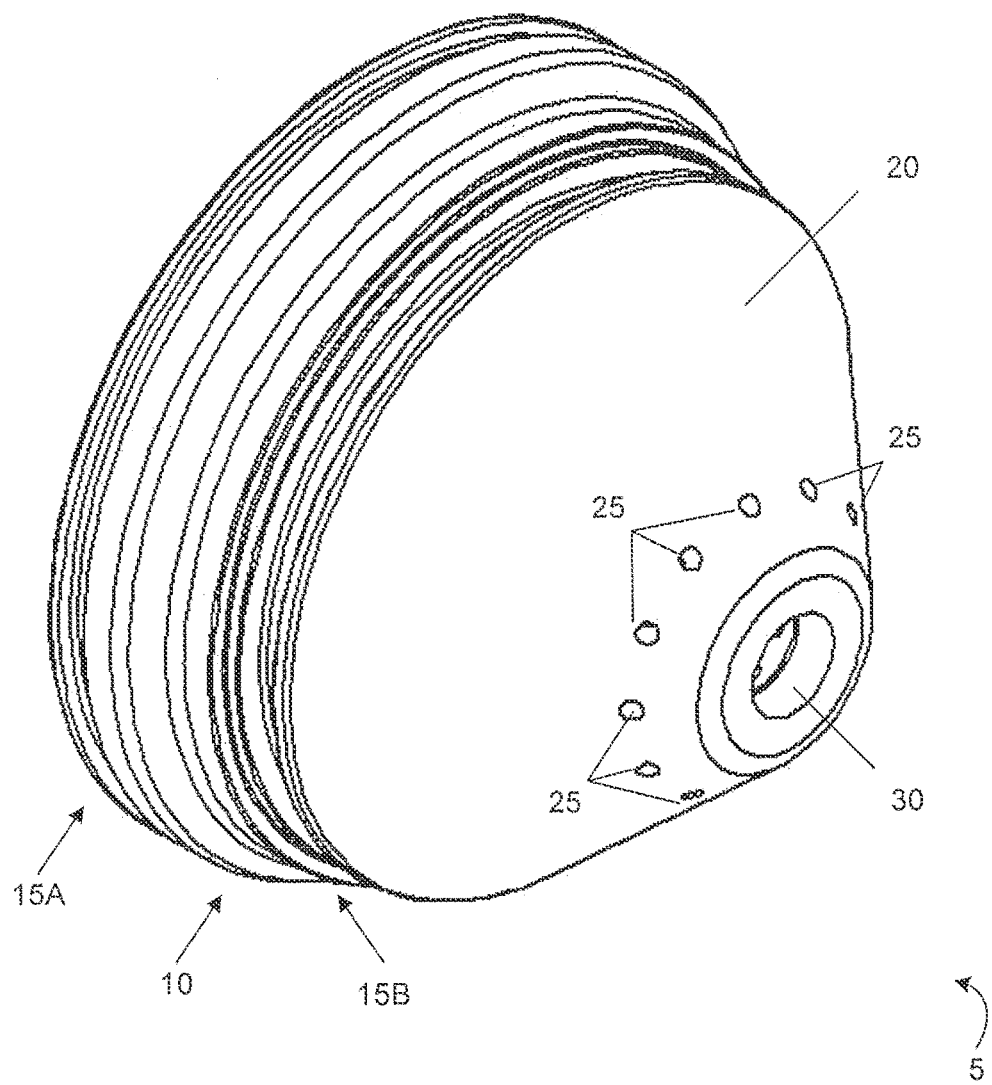
FIG. 1 is a drawing of a shield according to an illustrative embodiment.

FIG. 1 is a drawing of a shield 5 according to an illustrative embodiment. The shield 5 can be disposed relative to a plasma arc torch that pierces and cuts a metallic workpiece producing a splattering of molten metal directed at the torch. The shield 5 can protect consumable components of the plasma arc torch from the splattering molten metal. The shield includes a body. In this embodiment, the body of the shield includes a first surface that is configured to be contact-cooled by a gas flow (not shown). Contact-cooling can include cooling a portion of the shield (e.g., surface) by contacting it with a coolant (e.g., cooling medium, cooling liquid, cooling gas, etc.). In some embodiments, the surface cooled by the gas flow is an internal surface (e.g., hole, exit port) disposed relative to the shield. The body of the shield also includes a second surface 10 configured to be contact-cooled by a liquid flow. In some embodiments, the body of the shield includes two pieces. In some embodiments, cooling the shield 5 involves providing for constant liquid flow around an outer surface of the shield 5. In this embodiment, the shield 5 also includes a seal assembly 15A and 15B (e.g., o-ring, epoxy seal, hard metal contact on high tolerance surfaces, or any combination thereof) configured to be secured to the body (e.g., an o-ring disposed on the shield 5 in a channel disposed relative to the shield 5, an o-ring disposed on the shield 5 without a channel disposed relative to the shield, feature of the body sealing the liquid flow relative to a retainer cap, or any combination thereof), the seal assembly 15A and 15B disposed relative to (e.g., adjacent to) the second surface 10. The seal assembly 15A or 15B can be configured to retain the liquid flow contact-cooling the second surface 10.

In some embodiments, the shield 5 is comprised of a material that provides for a consistent thermal medium (e.g., metal) so that a surface 20 of the shield exposed to a splattering molten metal is conductively cooled as a result of at least one of the liquid flow contact-cooling the second surface 10 or the gas flow contact-cooling the first surface (not shown). In some embodiments, conductively cooling a portion (e.g., surface, region) of the shield includes cooling within a portion of the shield having a temperature gradient across that portion of the shield. The shield 5 also can include exit ports 25 for a shielding gas to exit, providing protection to the shield 5. The shield 5 also includes an exit orifice 30 that permits the passage of a plasma arc and a flow of a gas.

Keeping a shield 5 cool can increase the pierce thickness capability and also prevent the formation of a good bond between the molten slag and the shield 5. In some embodiments, cooling the shield 5 includes chilling the shield 5. In some embodiments, the liquid flow has a low enough temperature (e.g., less than about 60 degrees Fahrenheit or 40 degrees Fahrenheit) that the liquid flow chills the shield 5 by contact-cooling the second surface 10 and conductively chilling the rest of the shield 5. Reduced slag accumulation on the shield 5 extends the life of the shield 5. Reducing slag accumulation on the shield 5 reduces the chances of molten metal disturbing the plasma jet and gouging the nozzle and/or double arcing between the nozzle and the workpiece. Reduced shield temperature extends the thickness capability. Piercing of thick metal has been limited due to the relatively long pierce times needed to allow the arc to melt through the metal and because of the resultant molten slag which is blown back at the torch (e.g., primarily the shield 5). For example, the HT4400 400A process is limited to piercing 1¼" mild steel (MS). In some embodiments, when trying to pierce thicker steel, the shield 5 will eventually melt because the only cooling of the shield 5 is through the shield gas. Often when piercing steel of 1" and greater, the slag begins to accumulate on the shield 5 and if not cleaned off, the shield performance will begin to deteriorate as slag build up continues. Eventually the cut quality will be unacceptable or the shield 5 may even melt due to the large mass of hot steel. In some tests, it was discovered that the shield 5 accumulated large amounts of slag within 25 pierces. With accumulated slag, the shield 5 can melt and render the torch incapable of further pierces. In some embodiments, the piercing protocol requires that the process be able to pierce a given thickness of plate 300 times without operator intervention (e.g., cleaning the slag off the shield 5 between pierces).

Figure 2:
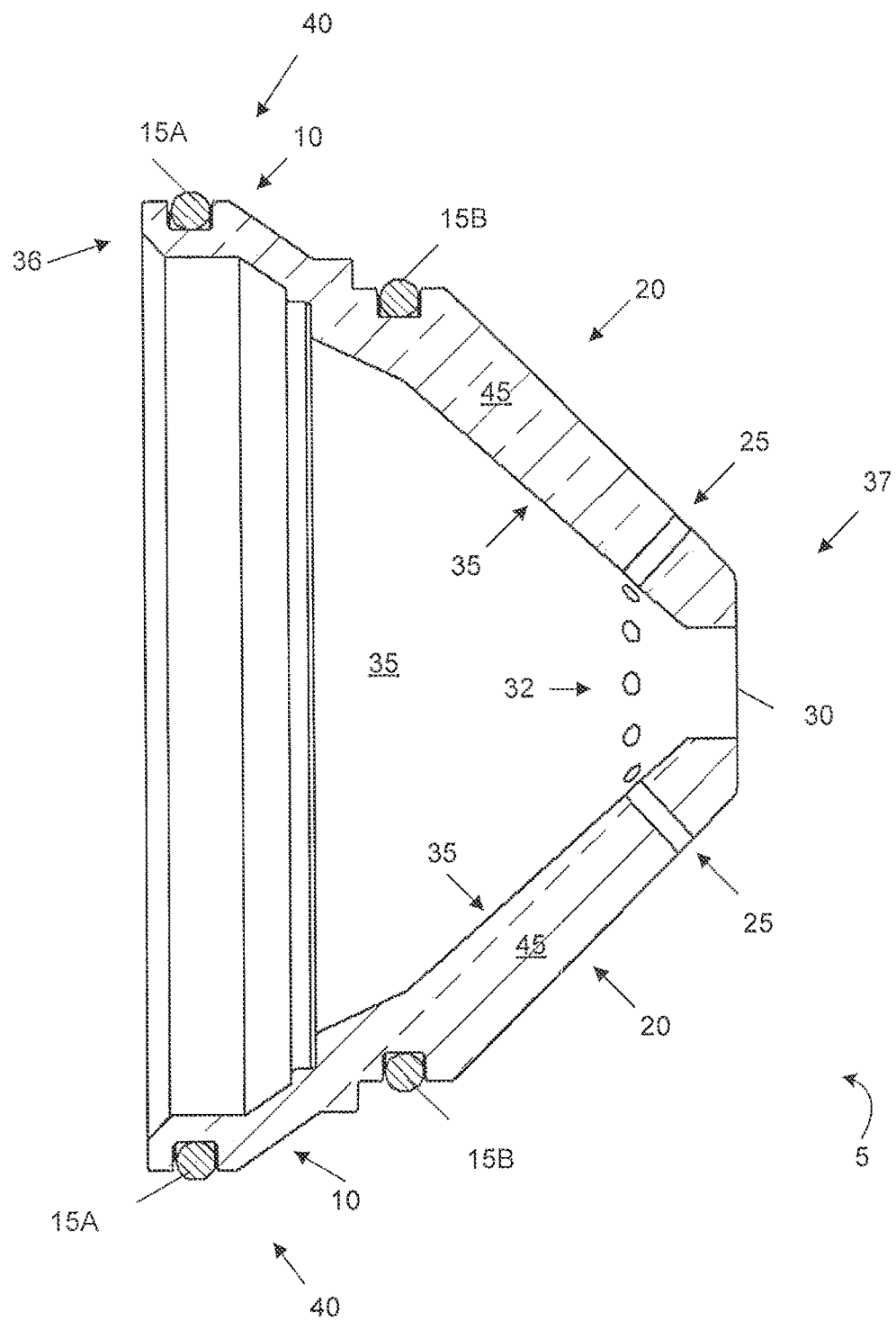
FIG. 2 is a cross section of a shield according to an illustrative embodiment.

FIG. 2 is a drawing of a cross section of a shield 5 according to an illustrative embodiment. In this embodiment, the shield 5 is disposed relative to a nozzle (not shown). In some embodiments, the shield 5 includes hole features 32 (e.g., exit ports) for a gas to flow through the hole features and through the exit ports of the shield 25. In some embodiments, the shield 5 includes a first surface 35, a second surface 10 and a third surface 20. The third surface 20 can be conductively cooled by at least one of liquid flow or gas flow. In some embodiments, second surface 10 is contact-cooled (e.g., cooling the surface by contacting it with a cooling medium) using a liquid to thereby produce conductive cooling and achieve a low temperature on the third surface 20, which can be exposed to molten metal during operation of a torch. In some embodiments, third surface 20 is conductively cooled as a result of contact-cooling the first surface 35 with a gas flow and/or contact-cooling the second surface 10 with a liquid flow.

In some embodiments, the second surface 10 is disposed relative to a first end 36 (e.g., proximal end) of the shield 5. In some embodiments, the shield 5 includes a body including an orifice disposed at a second end (e.g., distal end) of the body of the shield. The shield 5 can include a third surface 20 that is exposed to the splattering molten metal and is not contact-cooled by the liquid flow or the gas flow. The third surface 20 can be conductively cooled by the gas flow contact-cooling the first surface 35 or the liquid flow contact-cooling the second surface 10. In some embodiments, the third surface 20 is disposed on an outer surface of the shield and the second surface 10 is disposed proximally relative to the third surface 20. In some embodiments, the third surface 20 exposed to molten metal is disposed relative to the second end 37 (e.g., distal end) of the body of the shield. In some embodiments, the second surface 10, which is contact-cooled by the liquid flow, is disposed proximally relative to the third surface 20 exposed to the molten metal. The shield 5 can also include a flange 40 disposed relative to the first end 36 of the shield 5, at least a portion of the first surface 35 and/or second surface 10 disposed on the flange 40. In some embodiments, the third surface 20 can be disposed distally relative to the flange 40. The flange 40 can be disposed proximally relative to the third surface 20 (e.g., the surface of the shield exposed to the molten metal). In some embodiments, at least a portion of the first surface 35, which is contact-cooled by a gas flow, is disposed on an inner surface of the flange 40 or the shield 5. In some embodiments, at least a portion of the second surface 10, which is contact-cooled by a liquid flow, is disposed on an outer surface of the flange 40 or the shield 5.

In this embodiment, the first surface 35 contact-cooled by a gas flow is disposed on an inner surface of the shield that is not exposed to splattering molten metal. In some embodiments, the gas flow convectively cools the first surface 35. In this embodiment, the second surface 10 contact-cooled by the liquid flow is disposed on an outer surface of the shield. In some embodiments, cooling the shield 5 involves providing for constant liquid flow around an outer surface of the shield 5. In some embodiments, the liquid flow convectively cools the second surface 10. In some embodiments, the shield 5 includes a flange 40 (e.g., lip) and at least a portion of the first surface 35 and at least a portion of the second surface 10 are disposed relative to the flange 40.

The shield 5 can include a region 45 that is conductively cooled (e.g., cooling occurring within the region with a temperature gradient across the region) by at least one of the gas flow or the liquid flow. The region 45 can be any part of the shield that is not in contact with the coolant (e.g., cooling medium such as a liquid or gas). In some embodiments, the region is the surface of the shield exposed to splattered molten metal or even a part of the shield below the surface in contact with the coolant. In some embodiments, the liquid flow has a low enough temperature (e.g., less than about 60 degrees Fahrenheit or 40 degrees Fahrenheit) that the liquid flow chills the shield 5 by contact-cooling the second surface 10 and conductively chilling the rest of the shield 5. The shield 5 is configured so as to provide a thermally conductive path between at least the first surface 35 or second surface 10 to the conductively cooled region 45. In some embodiments, the shield 5 is a unitary structure made of metal or a thermally conductive medium. In some embodiments, the shield 5 is comprised of a plurality of structures comprised of a consistent thermal medium, forming a consistent thermally conductive path. In some embodiments, the shield 5 is comprised of a plurality of structures having similar thermal properties.

The shield 5 can be for a plasma arc torch (not shown) that pierces and cuts a metallic workpiece producing a splattering of molten metal directed at the torch. The shield 5 can include a portion configured to be directly cooled by a flowing liquid (e.g., the second surface 10) and a first sealing mechanism 15A and a second sealing mechanism 15B disposed relative to the portion cooled by the liquid. The portion configured to be directly cooled by the liquid (e.g., the second surface 10) can be disposed on an outer surface of the shield 5 and the portion configured to be directly cooled by the gas can be disposed on an inner surface of the shield 5. The first and second sealing mechanism 15A and 15B can be configured to retain the flowing liquid directly cooling the liquid-cooled portion of the shield (e.g., the second surface 10) relative to a retainer cap (not shown) of a plasma arc torch. The sealing mechanism 15A or 15B can be at least one of an o-ring, epoxy seal or hard metal contact seal. The shield can also include a portion configured to be directly cooled by a gas (e.g., first surface 35). The shield can also include a lip (e.g., flange 40), wherein the portion configured to be directly cooled by the liquid (e.g., the second surface 10) is disposed on the lip (e.g., flange 40).

In some embodiments, a method for reducing formation of slag on a shield 5 secured to a plasma arc torch (not shown), that pierces and cuts a metallic workpiece producing splattered molten metal directed at the torch, can include contact-cooling a first surface 35 of the shield 5 by a gas flow. The method can also include contact-cooling a second surface 10 of the shield 5 by a liquid flow and providing a seal assembly 15A and 15B to retain the liquid flow, the seal assembly 15A and 15B configured to retain the liquid in contact with the second surface 10 relative to a retainer cap (not shown) of the plasma arc torch. The method can also include conductively cooling a third surface 20 of the shield 5 exposed to the splattered molten metal by providing a thermal conductive path formed at least in part of a thermally conductive material in thermal communication with the first surface 35 and the second surface 10. The step of contact-cooling the second surface 10 by the liquid flow can include providing for constant liquid flow around an outer surface of the shield 5.

Figure 3:
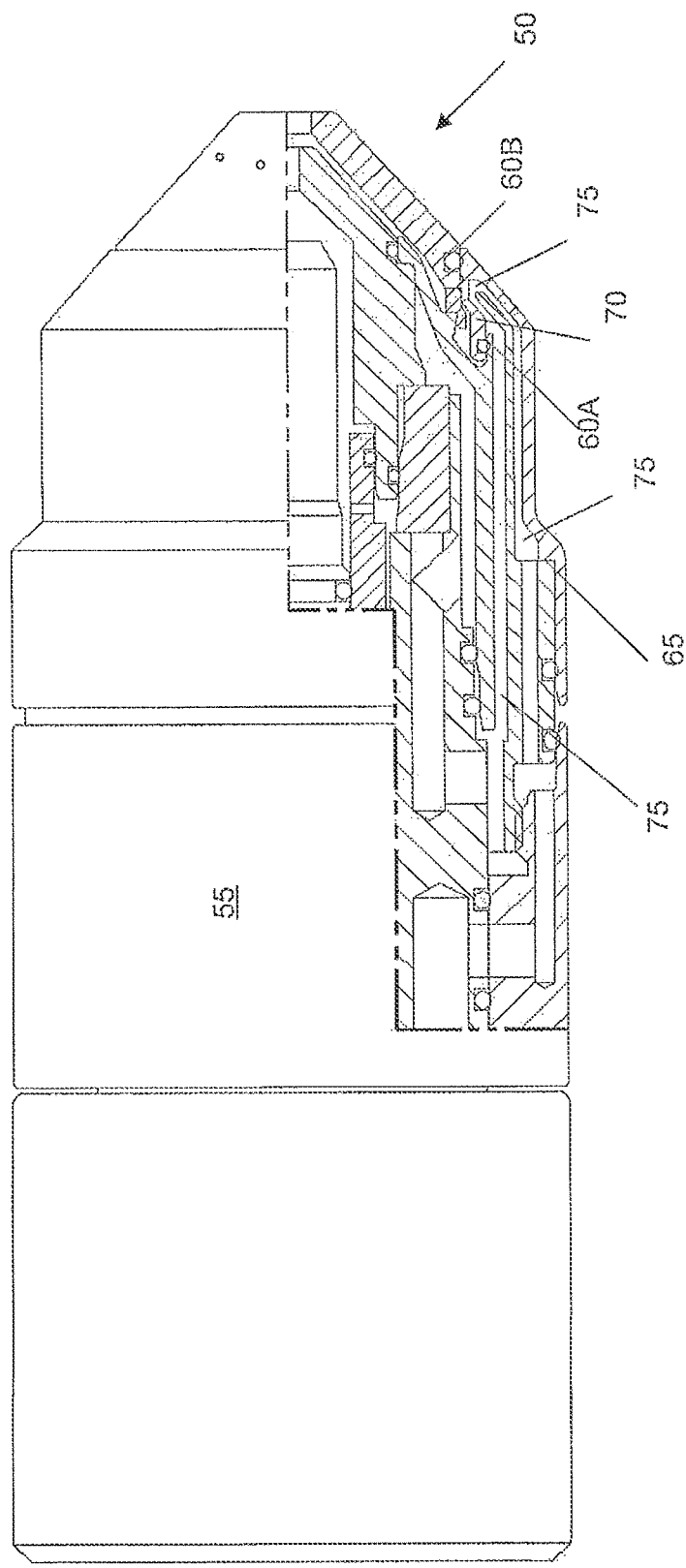
FIG. 3 is a partial cross section of the shield and a plasma arc torch according to an illustrative embodiment.

FIG. 3 is a partial cross section of a shield 50 disposed relative to a plasma arc torch 55, according to an illustrative embodiment. The shield 50 can be in communication with a plasma arc torch 55. In some embodiments, the shield 50 includes a seal assembly 60A and 60B in mechanical communication with a retainer cap 65 of the plasma arc torch 55. In some embodiments, the seal assembly 60A and 60B of the shield 50 is a plurality of o-rings. The o-rings can be configured to retain the liquid flow contact-cooling the second surface 70 of the shield (e.g., cooling a surface by contacting it with a coolant). In some embodiments, cooling the shield 50 involves providing for constant liquid flow around an outer surface of the shield 50. In some embodiments, the liquid flow has a low enough temperature (e.g., less than about 60 degrees Fahrenheit or 40 degrees Fahrenheit) that the liquid flow chills the shield 50 by contact-cooling the second surface 70 and conductively chilling the rest of the shield 50 (e.g., chilling occurring within the rest of the shield with a temperature gradient across the rest of the shield 50). In this embodiment, the shield 50 is secured to the plasma arc torch 55 so that the shield 50 is in mechanical communication with the retaining cap 65, forming a path 75 that allows for a liquid to flow from a source (not shown) through the plasma arc torch 55, flow to and contact-cool the second surface 70 of the shield 50 and flow back through the plasma arc torch 55.

A method for reducing formation of slag on a shield 50 secured to a plasma arc torch 55, that pierces and cuts a metallic workpiece producing splattered molten metal directed at the torch 55, can include rapidly cooling the shield 50 secured to the plasma arc torch 50 with a cooling medium flow. The method can include retaining the cooling medium flow in the plasma arc torch 55 and repeatedly cooling the shield 50 (e.g., cooling the shield a plurality of times, a plurality of cycles, etc.) to prevent formation of slag on a surface of the shield exposed to the splattered molten metal. The step of rapidly cooling can include cooling the shield 50 such that molten metal is cooled to prevent strengthening of the bond between the molten metal and the shield 50. Rapidly cooling the shield 50 can also include cooling the shield 50 so that the shield 50 stays at substantially the same temperature during piercing as before piercing by extracting the heat from the molten metal in contact with the surface of the shield 50. The step of rapidly cooling the shield 50 can include contact-cooling a surface of the shield 50 in thermal communication with the surface of the shield 50 exposed to the splattered molten metal. The surface of the shield 50 exposed to the splattered molten metal can be conductively cooled. In some embodiments, the shield 50 is cooled to below ambient temperature. The shield can be cooled to below about 60 degrees Fahrenheit.

Figure 4:
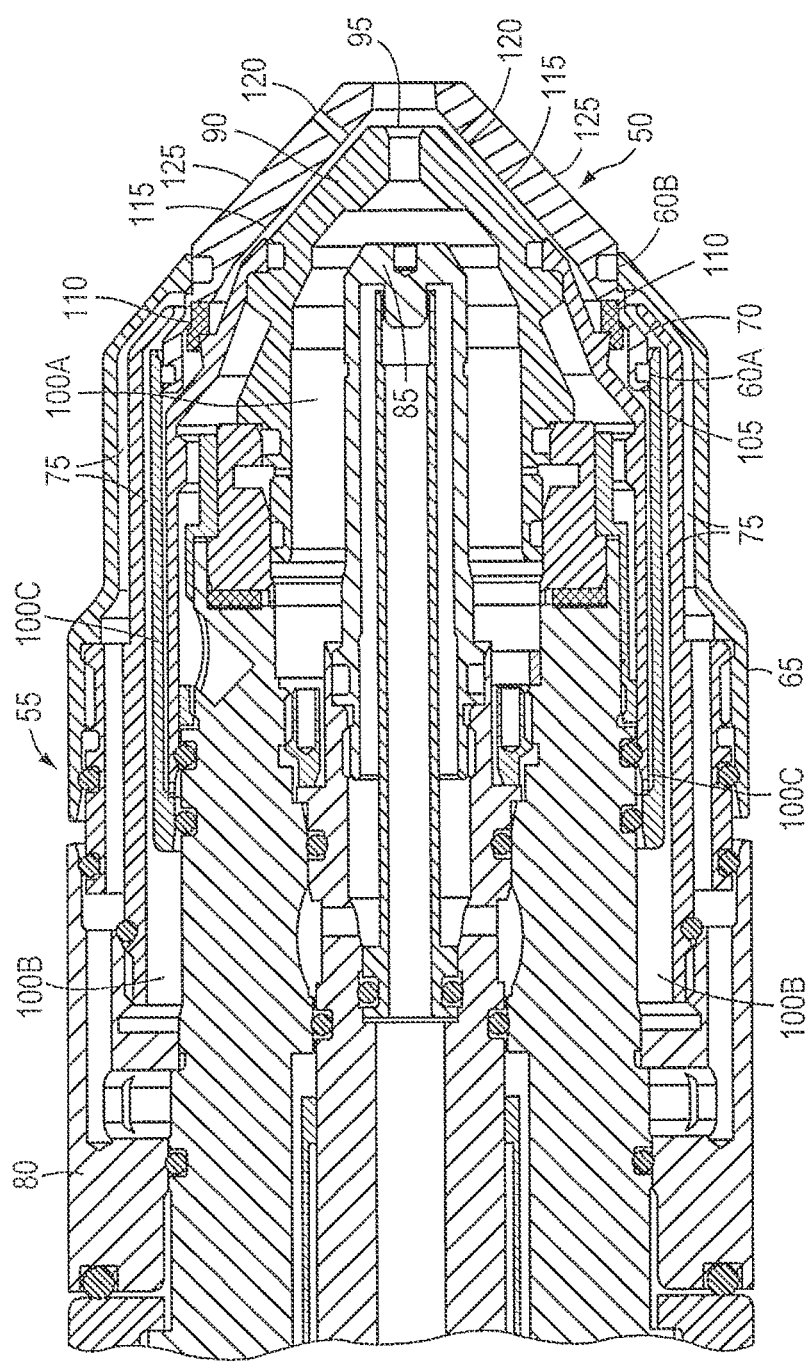
FIG. 4 is another cross sectional view of the shield and plasma arc torch according to an alternative illustrative embodiment.

FIG. 4 is another cross sectional view of the shield 50 and plasma arc torch according to an illustrative embodiment. The plasma arc torch 55 includes a torch body 80, an electrode 85 (e.g., cathode) mounted within the body, a nozzle 90 (e.g., anode) with a central orifice 95 that produces a pilot arc to the electrode 85 to initiate a plasma arc. Also depicted are associated electrical connections and passages for plasma gas 100A, passages for cooling liquid 100B, and passages for shield gas 100C. In this embodiment, the shield 50 is disposed relative to a plasma arc torch 55. The shield 50 generally surrounds the nozzle 90. In some embodiments, the shield 50 includes a flange 105. The shield 50 also includes a securing device 110 to secure the shield 50 to the plasma arc torch 55. The securing device 110 can be a threaded portion that can be screwed on to the torch body 80 or on a retainer cap 65. In this embodiment, a path 75 allows for a liquid to flow from a source (not shown) through the plasma arc torch 55, cool the electrode 85, cool the outer surface of the nozzle 90, flow to and contact-cool the second surface 70 of the shield 50 and flow back through the plasma arc torch 55. In some embodiments, components of the plasma arc torch 55 (e.g., electrode 85, nozzle 90, shield 50) can be cooled in a different/alternative sequence. In some embodiments, cooling the shield 50 involves providing for a constant liquid flow around an outer surface of the shield 50.

In some embodiments, the first surface 115 contact-cooled (e.g., cooling by contacting a surface with a coolant) by a gas flow is disposed on an inner surface of the shield 50. The shield 50 can include passages for the gas flow to exit, allowing the gas flow to not only contact-cool the first surface 115, but also act as a shielding gas that protects the shield 50 from the splattering molten metal as it exits the shield. In some embodiments, the shield 50 includes a flange 105 and at least a portion of the first surface 115 is disposed on an inner surface of the flange 105.

In some embodiments, the shield 50 includes a flange 105 and at least a portion of the second surface 70 contact-cooled by a liquid flow is disposed on an outer surface of the flange 105. In some embodiments, the liquid flow contact-cools the second surface 70 of the shield 50 by providing for constant liquid flow around the outer surface of the shield 50. In some embodiments, constant liquid flow is provided around an outer surface of the flange 105.

In some embodiments, the liquid flow has a low enough temperature (e.g., less than about 60 degrees Fahrenheit or 40 degrees Fahrenheit) that the liquid flow chills the shield 50 by contact-cooling the second surface 70 and conductively chilling the rest of the shield 50 (e.g., chilling occurring within the rest of the shield with a temperature gradient across the rest of the shield 50). As can be seen in FIG. 4, the shield can include a third surface 125 that is disposed on an outer surface of the shield and is exposed to the splattering of molten metal when the plasma arc torch pierces and cuts a metallic workpiece. The shield 50 is comprised of a consistent thermal medium, allowing the third surface 125 to be conductively cooled by at least one of the gas flow or the liquid flow.

In some embodiments, a plasma arc torch system can include a plasma arc torch 55, a cooling device (not shown) configured to provide a cooling medium and a shield 50 disposed relative to the plasma arc torch 55, a first portion of the shield being exposed to splattering molten metal (e.g., third surface 125). The shield 50 can include a second portion directly cooled by the cooling medium (e.g., first surface 115, second surface 70 or any combination thereof) flowing from the cooling device, the second portion (e.g., first surface 115, second surface 70 or any combination thereof) in thermal communication with the first portion exposed to splattering molten metal. A sealing device (e.g., seal assembly 60A or 60B) can also be configured to retain the cooling medium flowing from the cooling device, the sealing device configured to retain the cooling medium in contact with the second portion of the shield in the plasma arc torch. The cooling device can be a chiller. In some embodiments, the cooling medium repeatedly cools (e.g., cooling the shield a plurality of times, a plurality of cycles, etc.) the second portion.

Figure 5:
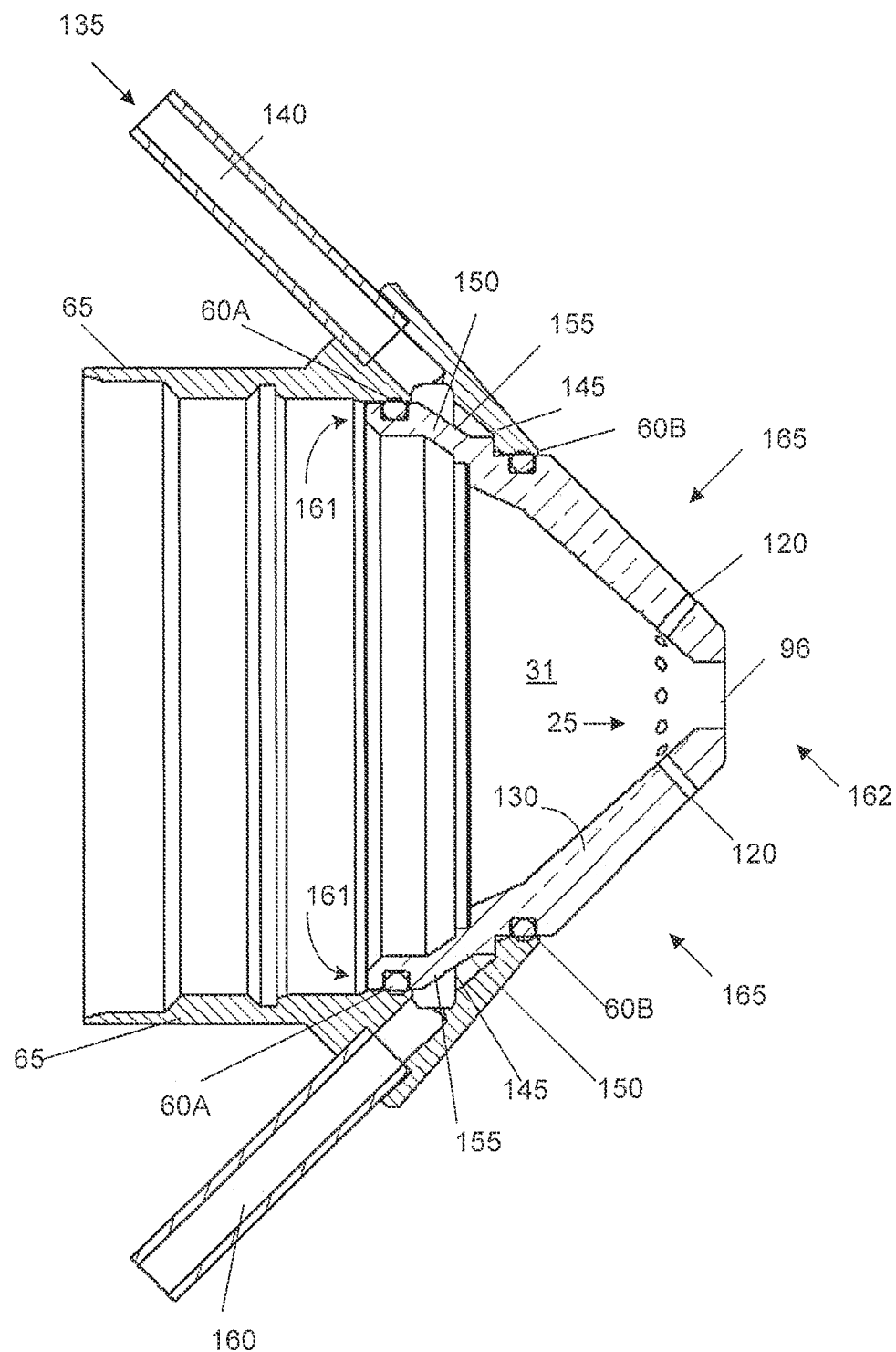
FIG. 5 is drawing depicting a shield cooled by a liquid, according to an illustrative embodiment.

FIG. 5 is drawing depicting a shield 130 cooled by a liquid, according to an illustrative embodiment. In this embodiment, the liquid flows from the supply 135 through a supply channel 140, through an annular cooling plenum 145, the liquid flow contact-cooling (e.g., cooling a portion or surface by contacting it with a coolant or cooling medium) a portion of an outer surface 155 on the shield. In some embodiments, the shield 130 comprises a flange 150 and the liquid flow contact-cools a portion of an outer surface of the shield 155 on the flange 150. In this embodiment, after contact-cooling a portion of an outer surface of the shield 155, the liquid flows from the shield 130 through a return channel 160. This embodiment can allow for a constant liquid flow around an outer surface of the shield 130.

In some embodiments, the outer surface 155 of the shield, which is contact-cooled by the liquid flow, is disposed relative to a first end 161 of the shield 130. In some embodiments, the shield includes a surface exposed to splattering molten metal 165 disposed relative to a second end 162 (e.g., distal end) of the shield 130. In some embodiments, the outer surface 155, which is contact-cooled by the liquid flow, is disposed proximally relative to the surface exposed to the splattering molten metal 165.

Retaining the liquid flow permits lossless contact-cooling of the shield 130 by the liquid flow. The shield 130 is comprised of a material that provides a consistent thermal medium (e.g., metal). Providing for a constant liquid flow contact-cooling a portion of an outer surface of the shield conductively (e.g., cooling occurring in a portion of an outer surface of the shield with a temperature gradient across the portion of an outer surface of the shield), and repeatedly (e.g., cooling the shield a plurality of times, a plurality of cycles, etc.), cools the surface exposed to splattering molten metal 165. Providing for the constant liquid flow permits rapid and repeated cooling of the shield 130 (e.g., by conductive cooling) to prevent formation of slag on a surface of the shield exposed to the splattered molten metal 165. In some embodiments, the liquid flow has a low enough temperature (e.g., less than about 60 degrees Fahrenheit or 40 degrees Fahrenheit) that the liquid flow chills the shield 130 by contact-cooling a portion of an outer surface of the shield 155 and conductively chilling the rest of the shield 130.

Rapidly cooling a shield prevents bonding between molten metal with the shield and/or prevents strengthening of the bond between the molten metal and shield. For example, rapidly cooling the shield can include cooling the shield fast enough to repeatedly cool (e.g., cooling the shield a plurality of times, a plurality of cycles, etc.) molten spray to: i) prevent bonding of molten metal to the shield or ii) prevent molten metal from coming into strong contact with the shield prior to solidification of the molten metal. Rapidly cooling the shield can include contact-cooling at least a portion of a surface of the shield or conductively cooling regions of the shield. Rapidly cooling the shield can include cooling the shield so that the shield remains at substantially the same temperature during a spray of molten metal by extracting the heat from the molten metal in contact with the shield. In some cases, rapid cooling of the shield can be achieved through the embodiments described herein and, in particular, with respect to FIGS. 1-5.

Figure 6:
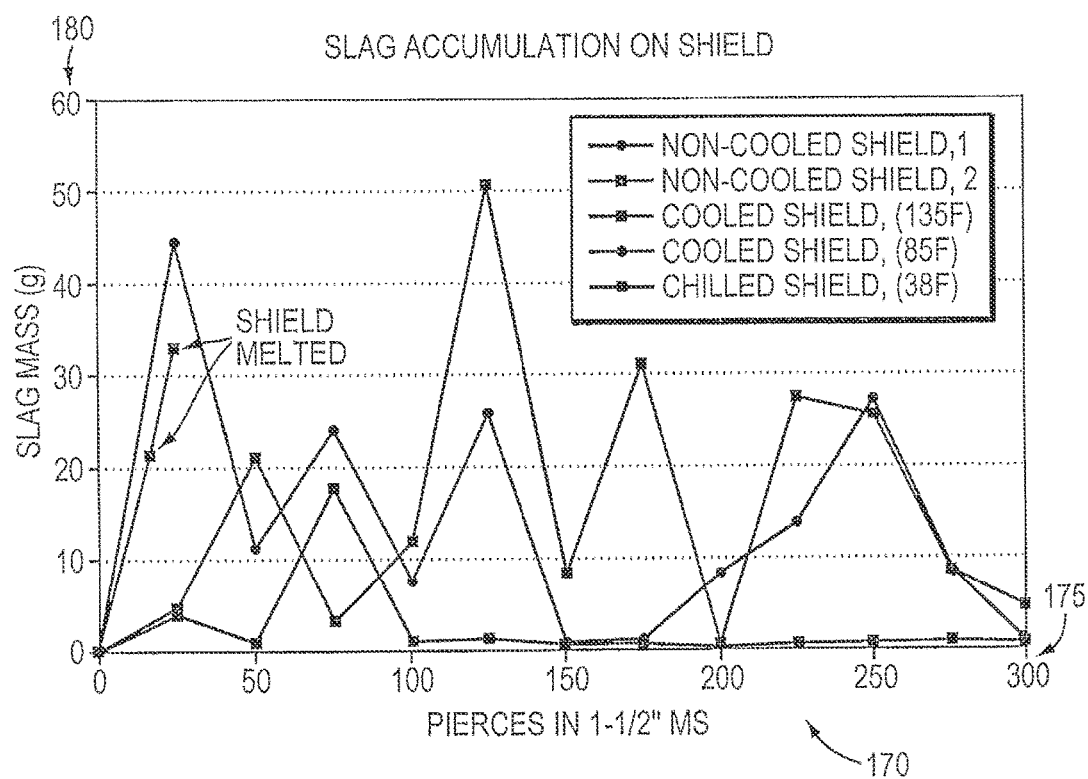
FIG. 6 is a graph demonstrating slag accumulation in pierce protocol tests utilizing a shield according to an illustrative embodiment.

FIG. 6 is a graph 170 demonstrating slag accumulation in pierce protocol tests utilizing a shield according to an illustrative embodiment. Pierce protocol tests were conducted with the shield/outer cap assembly being weighed after every 25 pierces as an indicator of the slag accumulation level. The tests were done using 1½" mild steel (MS). The x-axis 175 of the graph indicates the number of pierces and the y-axis 180 of the graph indicates the slag mass that was accumulated. Three different levels of bulk coolant temperature were used: 135 degrees Fahrenheit, 85 degrees Fahrenheit, and 38 degrees Fahrenheit. The cooling fluid was water and the 38 degrees Fahrenheit was chosen as the lower end of the water's usable temperature. The performance can be enhanced if additives were used, or even other liquids (e.g., glycol). The protocol test results indicated that cooling the shield allowed the shield to last throughout the 300 pierces. The graph 170 shows that the when the shield was not cooled, the shield melted before 50 pierces could be achieved. The 38 degrees Fahrenheit water temperature resulted in a reduced amount of slag accumulating on the shield.

Figure 7:
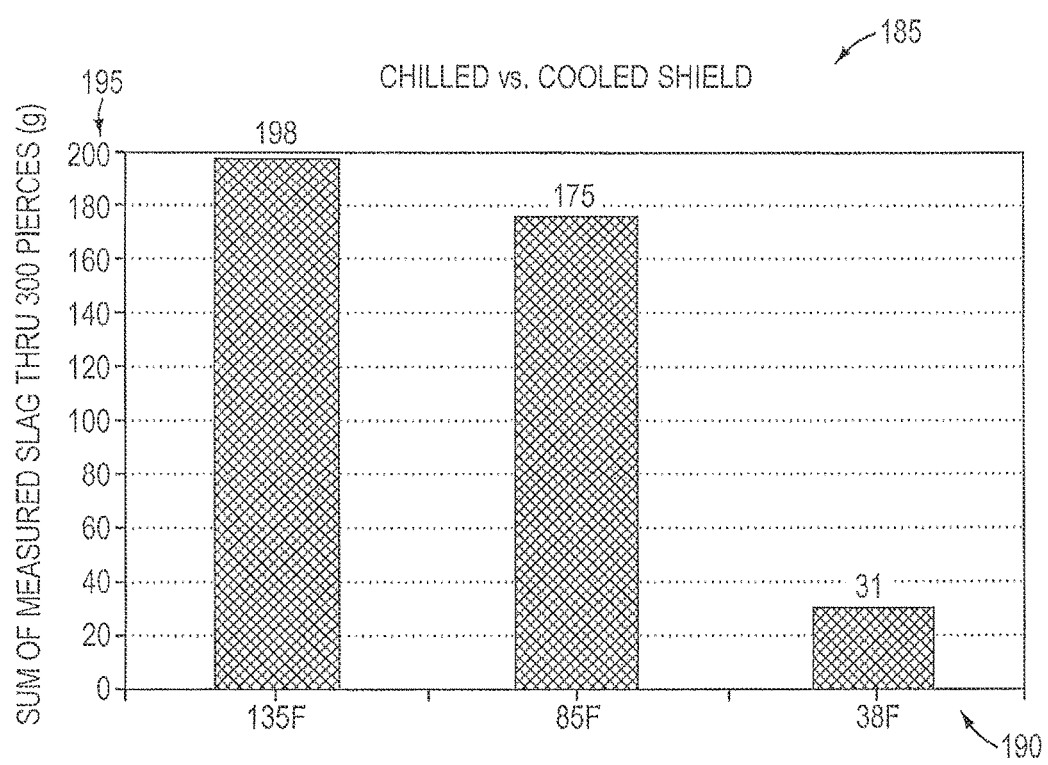
FIG. 7 is a graph demonstrating slag on a chilled versus a cooled shield in pierce protocol tests utilizing a shield according to an illustrative embodiment.

FIG. 7 is an alternative graph 185 depicting the data from FIG. 6 demonstrating slag on a chilled versus a cooled shield in pierce protocol tests utilizing a shield according to an illustrative embodiment. In FIG. 7, the x-axis 190 indicates the three different levels of bulk coolant temperature used in the pierce protocol test: 135 degrees Fahrenheit, 85 degrees Fahrenheit, and 38 degrees Fahrenheit. The y-axis 195 indicates the sum of the measured slag through 300 pierces utilizing the shield according to an illustrative embodiment. The graph 185 demonstrates that a lower temperature of the cooled shield correlates to a lower sum of measured slag through the 300 pierces. For example, a shield cooled at 135 degrees Fahrenheit accumulated a sum of 198 grams of slag through the 300 pierces during the pierce protocol tests. A shield cooled at 85 degrees Fahrenheit accumulated a sum of 175 grams of slag through the 300 pierces during the pierce protocol tests. In comparison, a shield chilled at 38 degrees Fahrenheit accumulated a sum of 31 grams of slag through the 300 pierces during the pierce protocol tests.

Figure 8:
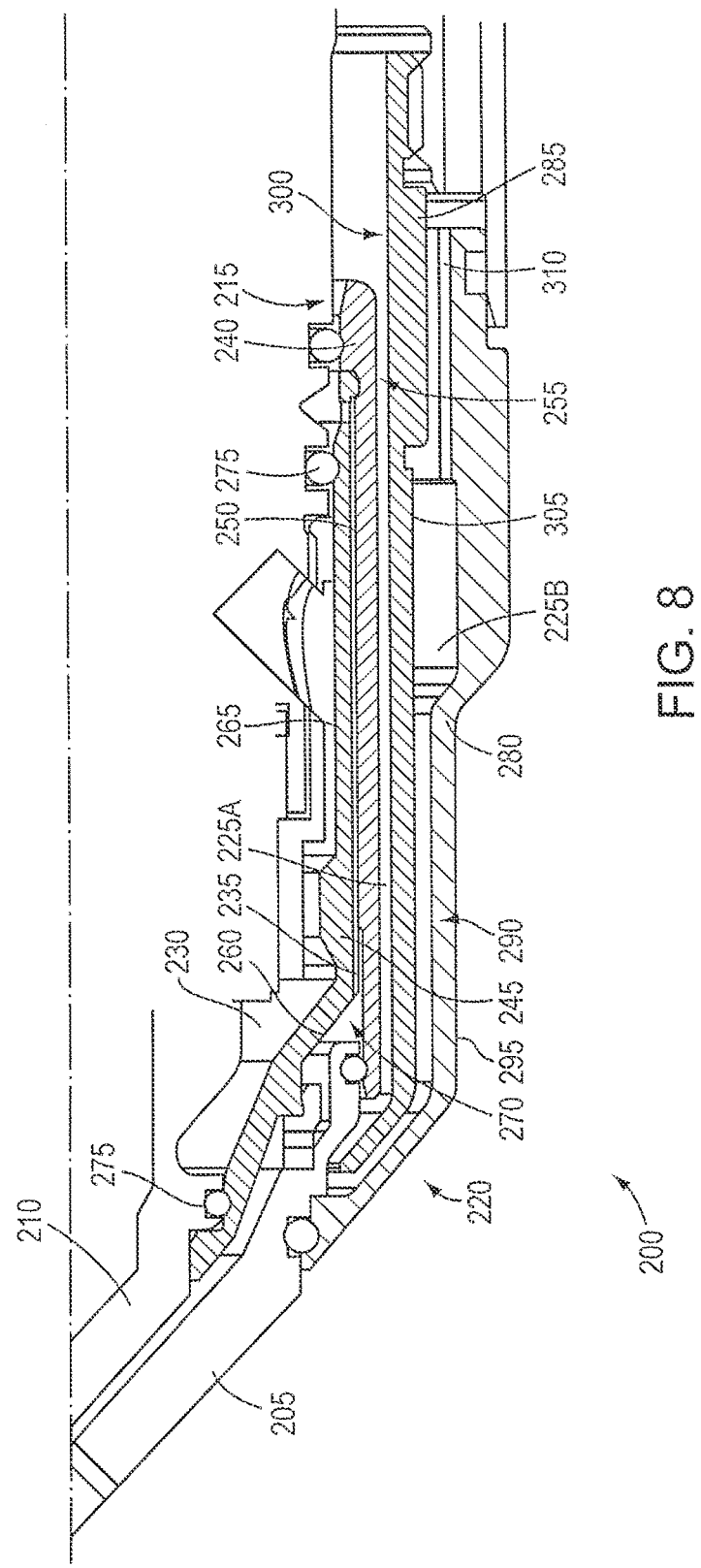
FIG. 8 is a partial cross sectional drawing of a stackup of consumables for a plasma arc torch according to an illustrative embodiment.

In some aspects, other torch components can also be liquid cooled to help achieve the results described above. For example, FIG. 8 is a partial cross sectional drawing of a stackup of consumables for a plasma arc torch 200 according to an illustrative embodiment. The plasma arch torch 200 can include an electrode (e.g., electrode 85 of FIG. 4), shield 205, nozzle 210, a retaining cap 215 that can be secured relative to the nozzle 210, and a shield retaining cap 220 that can be secured relative to the shield 205. The plasma arc torch can include liquid coolant channels 225A, 225B, and 230. The plasma arc torch can also have a gas flow channel 235.

The plasma arc torch 200 can include a torch body (e.g., torch body 80 of FIG. 4) including a plasma gas flow path for directing a plasma gas to a plasma chamber in which a plasma arc is formed. The plasma chamber can be defined at least in part by the electrode and a nozzle 210 disposed relative to the electrode to define the plasma chamber. An inner retaining cap (e.g., retaining cap 215) can be secured relative to the nozzle 210. In some embodiments, a shield 205 is disposed relative to the nozzle 210 and an outer retaining cap (e.g., shield retaining cap 220) is secured relative to the shield 205.

Retaining cap 215 (e.g., nozzle retaining cap) can include an outer component 240 and inner component 245. The outer component 240 can have an interior surface 250 and an exterior surface 255. The exterior surface 255 of the outer component can define, at least in part, a liquid coolant channel 225A. The retaining cap 215 can also include an inner component 245 circumferentially disposed within the outer component 240. The inner component 245 can have an exterior surface 260 and an interior surface 265. The interior surface 265 of the inner component 245 can be secured relative to a nozzle 210 of the plasma arc torch 200.

The gas flow channel 235 of the plasma arc torch 200 can be defined at least in part by the interior surface 250 of the outer component 240 and the exterior surface 260 of the inner component 245 of the retaining cap 215. A port 270 (e.g., exit port) can be disposed at an end of the gas flow channel 235. The port 270 can be disposed between the interior surface 250 of the outer component 240 and the exterior surface 260 of the inner component 245 of the retaining cap 215.

The interior surface 265 of the inner component 245 can define, at least in part, another liquid coolant channel 230. In some embodiments, the interior surface 265 of the inner component 245 can include sealing assembly 275 that seals liquid coolant relative to a plasma arc torch body. The interior surface 265 of the inner component 245 and the plasma arc torch body can define, at least in part, liquid coolant channel 230. The exterior surface 255 of the outer component 240 and a shield retaining cap 220 (e.g., outer retaining cap) of the plasma arc torch 200 can define, at least in part, liquid coolant channel 225A. In some embodiments liquid coolant channel 225A can be in fluid communication (e.g., connected via a fluid conduit, passage, tubes, etc.) with the liquid coolant channel 230. Liquid coolant channel 225A can be a supply flow of liquid coolant. In some embodiments, liquid coolant channel 225 B can be a return flow of liquid coolant. The gas flow channel 235 can supply a shield gas to a workpiece.

In some embodiments, retaining cap 215 includes a shell (e.g., outer component 240) having an exterior surface (e.g., exterior surface 255) that defines, at least in part, liquid coolant channel 225A. The retaining cap 215 can include a liner (e.g., an inner component 245) that is circumferentially disposed within the shell. The liner can include an interior surface (e.g., interior surface 265 of the inner component) that defines, at least in part, liquid coolant channel 230. Retaining cap 215 can include a gas flow channel 235 that is defined at least in part by and located between the shell and the liner.

A shield retaining cap 220 can include an outer component 280 and an inner component 285. The outer component 280 of the shield retaining cap 220 can include an interior surface 290 and an exterior surface 295. The inner component 285 can be circumferentially disposed within the outer component 280. The inner component 285 can have an interior surface 300 and an exterior surface 305. At least one of the inner component 285 or the outer component 280 can be secured relative to a shield 205.

Liquid coolant channel 225A can be defined, at least in part, by a portion of the interior surface 300 of the inner component 285 of the shield retaining cap 220. In some embodiments, the interior surface 300 of the inner component 285 and a retaining cap 215 (e.g., inner/nozzle retaining cap) define, at least in part, liquid coolant channel 225A. Liquid coolant channel 225B can be defined, at least in part, by the exterior surface 305 of the inner component 285 and the interior surface 290 of the outer component 280 of the shield retaining cap 220. In some embodiments, liquid coolant channel 225A and 225B make up a first portion of a liquid coolant channel and a second portion of the same channel, respectively. In some embodiments the liquid coolant channels 225A and 225B direct a coolant on to a shield 205. Liquid coolant channel 225A can serve as a path for a coolant supply flow and liquid coolant channel 225B can serve as a path to direct a coolant return flow. The shield retaining cap 220 can also include a port 310 at an end of liquid coolant channel 225A and/or 225B. Port 310 can be disposed between the exterior surface 305 of the inner component 285 and the inner surface 290 of the outer component 280 of the shield retaining cap 220. The port 310 can be disposed at an end of at least one of the outer component 280 or the inner component 285 of the shield retaining cap 220.

In some embodiments, the shield retaining cap 220 can include a shell (e.g., outer component 280 of the shield retaining cap 220) and a liner (e.g., inner component 285 of the shield retaining cap 220). The liner of the shield retaining cap 220 can be disposed circumferentially within an interior surface of the shell (e.g., interior surface 300 of the inner component 285 of the shield retaining cap 220). Liquid coolant channel 225A can be defined, at least in part, by an interior surface of the liner. Liquid coolant channel 225B can be defined, at least in part, by a portion of the interior surface of the shell and a portion of an exterior surface of the liner (e.g., exterior surface 305 of inner component 285 of the shield retaining cap 220).

A method for cooling a plasma arc torch can include directing a liquid coolant to an electrode (e.g., electrode 85 of FIG. 4), directing the liquid coolant to a nozzle 210 through a first liquid coolant channel (e.g., liquid coolant channel 230) defined, at least in part, by a first retaining cap (e.g., retaining cap 215) and directing the liquid coolant from the nozzle 210 to a shield 205 through a second liquid coolant channel (e.g., liquid coolant channel 225A and/or 225B) defined, at least in part, by a second retaining cap (e.g., shield retaining cap 220). Alternatively, in some embodiments, the sequence in which the coolant is directed to the electrode, nozzle, and shield can be reversed or reordered.

Figure 9:
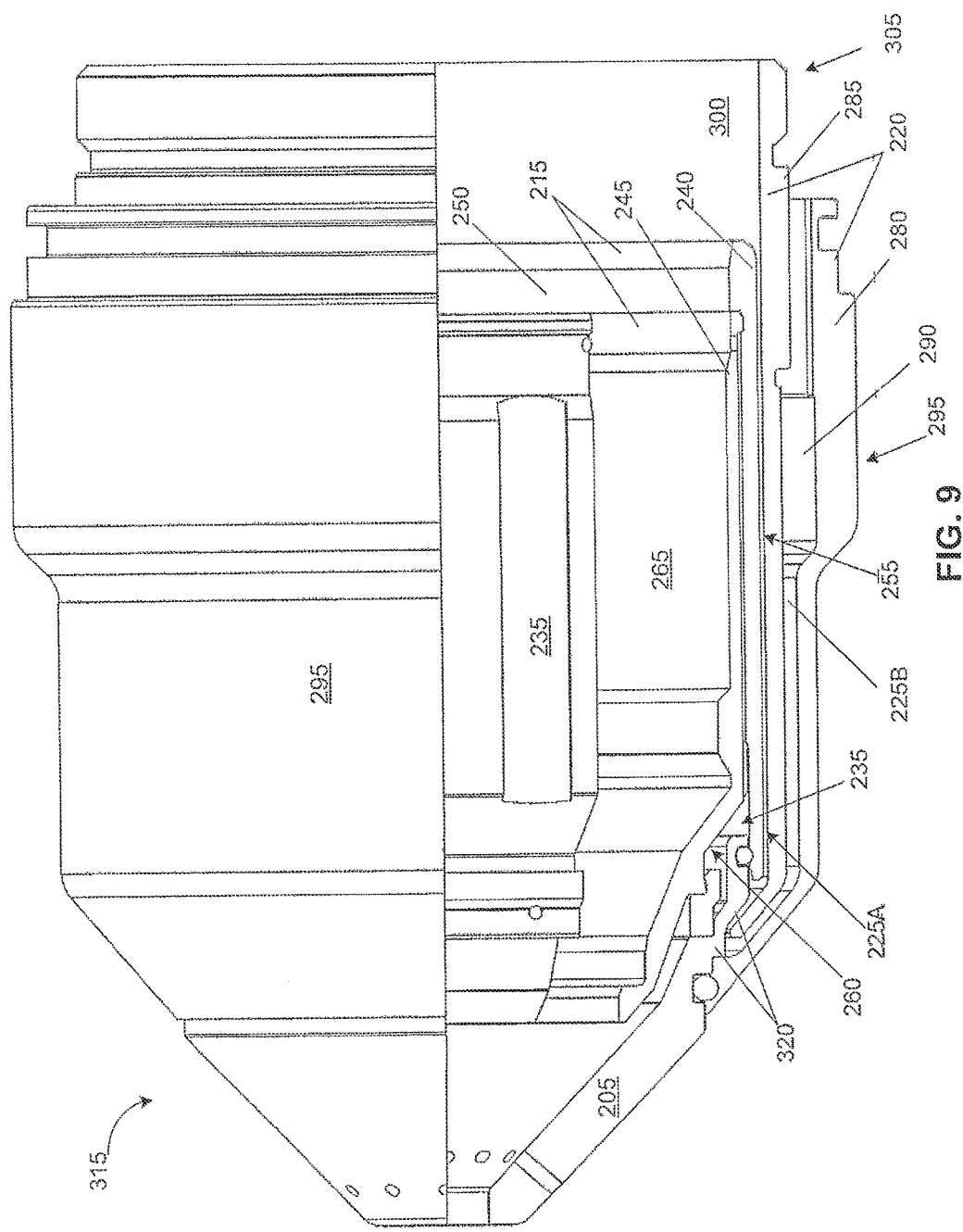
FIG. 9 is a cutaway drawing of consumables for a plasma arc torch according to an illustrative embodiment.

FIG. 9 is a cutaway drawing of consumables of a plasma arc torch 315 according to an illustrative embodiment. The plasma arc torch can include a retaining cap 215 and shield retaining cap 220 which can define coolant channels 225A, 225B and a gas flow channel 235.

Retaining cap 215 can include an outer component 240 and inner component 245. The inner component 245 of the retaining cap 215 can include an interior surface 265 and an exterior surface 260. The outer component 240 of the retaining cap 215 can include an inner surface 250 and an outer surface 255. The interior surface 265 of the inner component 245 can define a portion of liquid coolant channel (e.g., liquid coolant channel 230 in FIG. 8 above). Gas flow channel 235 can be disposed between or defined by the outer component 240 and inner component 245 of the retaining cap 215.

Shield retaining cap 220 can also include an outer component 280 and inner component 285. The outer component 280 of the shield retaining cap 220 can include an exterior surface 295 and an interior surface 290. The inner component 285 of the shield retaining cap 220 can include can exterior surface 305 and an interior surface 300. A liquid coolant channel comprised of liquid coolant channels 225A and 225B can be formed by the outer component 280 and inner component 285 of the shield retaining cap 220. Liquid coolant channel 225A can be formed at least in part by the inner component 285 of the shield retaining cap 220 and an outer component 240 of a nozzle retaining cap (e.g., retaining cap 215). Liquid coolant channel 225B can be disposed between and defined by the outer component 280 and inner component 285 of the shield retaining cap 220.

The shield retaining cap 220 can include a substantially cylindrical body (e.g., body comprised of outer component 280 and inner component 285) dimensioned to receive a shield 205 of the plasma arc torch. The shield retaining cap 220 can include a liquid coolant channel (e.g., comprising liquid coolant channels 225A and 225B) defined by the substantially cylindrical body. In some embodiments, liquid coolant is supplied via liquid coolant channel 225A, impinges a portion of the shield 205 (e.g., flange of the shield) and returns via liquid coolant channel 225B. The liquid coolant channel can include a return path (e.g., liquid coolant channel 225B) and a supply path (e.g., liquid coolant channel 225A) which directs a coolant to impinge a circumferentially extending portion 320 of the shield. The temperature of the coolant impinging the shield 205 can be consistent at each point along the circumferentially extending portion of the shield 320.

In some embodiments, the substantially cylindrical body includes a substantially cylindrical outer component (e.g., outer component 280) and a substantially cylindrical inner component (e.g., inner component 285) disposed within the outer component. The supply path of the liquid coolant channel (e.g., liquid coolant channel 225A) can be formed at least in part by an interior surface (e.g., interior surface 300) of the substantially cylindrical inner component. In some embodiments, the return path (e.g., liquid coolant channel 225B) of the liquid coolant channel is formed at least in part by an exterior surface (e.g, exterior surface 305 of the inner component) of the substantially cylindrical inner component and an interior surface (e.g., interior surface 290 of the outer component) of the substantially cylindrical outer component.

While the invention has been particularly shown and described with reference to specific illustrative embodiments, it should be understood that various changes in form and detail may be made without departing from the spirit and scope of the invention.

The invention claimed is:

1. A shield for a plasma arc torch that pierces and cuts a metallic workpiece producing a splattering of molten metal directed toward the torch, the shield configured to cover and protect at least a nozzle and a nozzle retaining cap of the plasma arc torch from the splattering molten metal and to be replaced independently of the nozzle, the shield comprising:
   a generally conical unitary body defining an interior surface to form a gas flow path with an outer surface of an adjacent nozzle of the plasma arc torch and an exterior surface, the body comprising:
      a distal first portion defining an exit orifice and having:
         i) a substantially conical exterior surface region exposed to the molten metal and formed along the exterior surface of the body, and ii) an interior surface region to be contacted by a cooling shield gas flow within the gas flow path along the interior surface of the body to cool the nozzle and the shield; and
      a proximal second portion formed of a flange sharing a common surface with the distal first portion having one or more surface regions to be directly cooled by a liquid coolant flow along the common surface shared with at least one of the exterior surface of the body or the interior surface of the body,
      the exterior surface region of the distal first portion being conductively cooled by the direct liquid cooling of the flange along a thermally conductive path formed through a continuous conductively cooled region so as to limit the molten metal splatter from bonding to the exterior surface of the distal first portion, at least a portion of the conductively cooled region disposed adjacent the flange; and
   a seal assembly disposed on the common surface shared between the flange of the proximal second portion and the distal first portion along the unitary body to retain the liquid coolant flow along the proximal second portion, to limit leakage of the liquid coolant flow from the plasma arc torch, and limit the liquid coolant flow from contacting the nozzle.

2. The shield of claim 1, wherein the unitary body is formed of a consistent thermal medium.

3. The shield of claim 1 wherein at least a portion of the surface region to be directly cooled by the liquid coolant flow is an outer exterior surface of the flange.

4. The shield of claim 1 wherein the body defines one or more exit ports formed through the distal first portion.

5. The shield of claim 1 wherein the one or more surface regions to be directly cooled by a liquid coolant reduces molten splatter material from accumulating on the shield during use of the torch.

6. The shield of claim 1 wherein the cooling shield gas flow convectively cools the interior surface of the body.

7. The shield of claim 1 wherein the liquid coolant flow convectively cools the one or more surface regions of the flange.

8. The shield of claim 1 wherein the seal assembly is in mechanical communication with a retaining cap that attaches the shield to the plasma arc torch.

9. The shield of claim 1 wherein the continuous conductively cooled region comprises a temperature gradient across the region.

10. The shield of claim 1 wherein the liquid coolant flow comprises a liquid chilled to less than about 60 degrees Fahrenheit.

11. The shield of claim 1 wherein the exterior surface region exposed to the molten metal is chilled to less than about 60 degrees Fahrenheit during use of the plasma arc torch.

12. The shield of claim 1 further comprising a channel in the body between the distal first portion and the proximal second portion, the channel configured to accept the seal assembly that retains the liquid coolant flow along the proximal second portion.

13. The shield of claim 1 wherein the exterior surface region exposed to the molten metal and formed along the exterior surface of the body is sufficiently large to intercept substantially all of the molten metal splatter.

14. The shield of claim 1 wherein the seal assembly comprises at least one of an o-ring, an epoxy seal, or a metal-to-metal contact seal.

15. The shield of claim 1 wherein the shield is attachable to the plasma arc torch, the shield configured to surround a nozzle of the plasma arc torch.

16. The shield of claim 1 wherein the unitary body is a single piece.

17. The shield of claim 1 wherein the direct liquid cooling prevents strengthening of a bond between the molten metal splatter and the exterior surface region of the distal first portion.

18. The shield of claim 1 wherein the shield is configured to be rapidly cooled such that the shield stays at substantially the same temperature during piercing as before piercing by extracting heat from the molten metal that is in contact with the exterior surface region of the distal first portion.

19. The shield of claim 1 wherein the shield is configured to be cooled to operate below ambient temperature.

20. The shield of claim 1 wherein the direct liquid cooling includes a constant liquid flow around the proximal second portion of the body.

21. The shield of claim 1 further including a cooling device configured to provide a cooling medium, wherein the cooling device is a chiller.

22. The shield of claim 1 wherein the unitary body is a one-piece solid body.

23. The shield of claim 1 wherein the distal first portion has a substantially consistent thickness between the exterior surface region and the interior surface region.

24. The shield of claim 1 wherein a length of the distal portion is greater than a length of the proximal portion.

25. The shield of claim 4 wherein a distance between the exit orifice and the one or more exit ports is greater than a distance between the one or more exit ports and the seal assembly.

* * * * *